United States Patent Office 3,404,135
Patented Oct. 1, 1968

3,404,135
PROCESS FOR THE MANUFACTURE OF MALEIC ACID ANHYDRIDE COPOLYMERS
Wolfgang Tietz, Rheinkamp-Hochhalen, Germany, assignor to Rheinpreussen Aktiengesellschaft für Bergbau und Chemie, Homberg-Niederrhein (Lower Rhine), Germany, a corporation of Germany
No Drawing. Filed Jan. 19, 1965, Ser. No. 427,214
Claims priority, application Germany, Jan. 21, 1964, R 37,021
20 Claims. (Cl. 260—78.5)

ABSTRACT OF THE DISCLOSURE

Lower aliphatic secondary alcohol is used as a reaction medium for making copolymers of maleic acid anhydride and other polymerizable unsaturated organic compounds. The monomers are dissolved in the medium and the copolymer precipitates therefrom. The copolymer is well suited to use in production of water-soluble derivatives since adhering or included solvent does not cause difficulty as it is soluble or partially soluble in water.

---

The subject of the invention is copolymers of maleic acid anhydride and other polymerizable, unsaturated organic compounds, such as olefin hydrocarbons and olefinically unsaturated aromatic hydrocarbons, in the copolymerization of which low aliphatic secondary alcohols are used as the reaction medium.

It is known to employ precipitation polymerization in the manufacture of copolymers of maleic acid anhydride and other polymerizable monomeric organic compounds. A solvent is used in that case in which the monomeric organic compounds are soluble, but the polymer is insoluble, so that the polymerization product precipitates out of the solution. Benzene and its homologs or mixtures thereof are mainly used as solvents. Such copolymers have been proposed for many different applications, since numerous reactions are possible on these polymers, such as esterifications, the formation of acid amides and the formation of salts. For example, alcohols can be used to make the monoesters and diesters with reference to each anhydride group. The monoesters of primary aliphatic alcohols form relatively quickly; the monoesters of secondary aliphatic alcohols form more slowly, but nevertheless completely. The manufacture of water-soluble derivatives of these maleic acid anhydride copolymers is also in the prior art, as for example the formation of alkali salts by reaction of these copolymers with alkali metal hydroxides, alkali metal bicarbonates or alkali metal carbonates, and the formation of amide ammonium salts and ammonium salts by reaction with ammonia. These polyanhydrides can furthermore be neutralized with organic amines. Likewise, the monoesters of these copolymers can be subjected to the same salt formation. When the copolymers are transformed into soluble derivatives, the residues of solvents which remain included in the polymer particles after the manufacture of the copolymers often prove troublesome, so that turbid aqueous solutions are obtained when the solvents used for the manufacture of the copolymers are not miscible with water. For this reason, special processes have been proposed for the removal of these solvent residues, such as dry steam distillation, i.e., distillation with super-heated steam. For many of these applications, maleic acid anhydride copolymers with a not excessively high molecular weight are to be preferred, since the solutions of these polymers or their derivatives are otherwise too viscous. In order to reduce the chain length of the polymers, substances which work as regulators have already been added in the polymerization; this is also accomplished by polymerization in high-boiling aromatic solvents as correspondingly high temperatures, as for example, by the use of boiling toluene or xylene instead of boiling benzene, by choosing the type of the catalyst and increasing the amount of catalyst, and by the use of those aromatic solvents which work as regulators on account of their structure. These are alkylated aromatic hydrocarbons which have as substituent a methyl group substituted by at least one alkyl radical and thus having one or two more hydrogen atoms and hence being capable of peroxide formation. Examples of such aromatic solvents are ethyl benzene and cumene.

It has now been found that copolymers of maleic acid anhydride and other polymerizable unsaturated organic compounds can be made even without the use of aromatics as reaction mediums if low secondary aliphatic alcohols are used as the alcohols under appropriate conditions of reaction, without the occurrence of esterification. This is very surprising, because on the one hand the monoesters of these copolymers can also be made with secondary aliphatic alcohols, and on the other hand the monoesters made with maleic acid and secondary aliphatic alcohols can without difficulty be copolymerized with other monomeric unsaturated organic compounds. In the process of the invention, which makes use of precipitation polymerization, when the mixture of maleic acid anhydride and the polymerizable unsaturated organic compound, in which a radical-producing catalyst is dissolved, is dripped into the aliphatic secondary alcohol heated to appropriate polymerization temperature, the maleic acid anhydride copolymer precipitates out. Since the polymerization reaction takes place very rapidly, no appreciable esterification takes place. The maleic acid anhydride can even be dissolved in the aliphatic secondary alcohol, the solution can be mixed with the other desired polymerizable unsaturated organic compound, and this mixture can be dripped into the aliphatic secondary alcohol used as the reaction medium. Even in this procedure, it is not, say, the formation of a copolymer of maleic acid semiester that takes place: instead, the maleic acid anhydride copolymer precipitates out in powder form. That is, the reaction of the maleic acid anhydride with the copolymerization component takes place much more rapidly than the formation of the semiester of maleic acid. The conventional measures for the reduction of the chain length of the copolymers can also be taken in the process of the invention for the manufacture of copolymers of maleic acid anhydride.

Copolymerizable unsaturated organic compounds are olefinic hydrocarbon compounds such as ethylene, propylene, butylene or isobutylene, or polymers of these olefins, such as diisobutylene or tetrapropylene. Higher olefins with more than 12 carbon atoms in the molecule are less suitable, since the speed of polymerization of the olefins decreases as the molecule size increases, and the longer reaction time thereby required induces the danger of the simultaneous esterification of the copolymers. Other copolymerizable unsaturated organic compounds are olefinically unsaturated aromatic hydrocarbon compounds such as styrene and its homologs, such as methyl styrene and vinyl xylene, p-methoxystyrene and divinyl benzene. It is possible to use acrylic or methacrylic compounds, but on account of their strongly developed tendency to homopolymerization they are not well suited for use as the sole second polymerization component. It has proven expedient to use maleic acid anhydride and the olefinically unsaturated hydrocarbon compound in the approximate molar ratio of 1:1.

The low aliphatic secondary alcohols are principally lower alkanol secondary alcohols especially isopropanol and sec. butanol. The next higher homologs, such as diethyl carbinol $(C_2H_5)_2CHOH$ and methyl-n-propylcarbinol and methyl isopropyl carbinol are less suitable since their water solubility (2 to 4 wt. percent water in 100 cc. of alcohol at 14° to 20° C.) is no longer great enough to reliably prevent the included solvent residues from causing turbidity in aqueous solutions of water-soluble derivatives of the copolymers.

The radical-forming catalysts may be any of the known catalysts of this kind, such as those which are known from the literature to be, for example, polymerization accelerators in the polymerization of unsaturated polyester resins from mainly unsaturated dicarboxylic acids and glycols with copolymerizable olefinic compounds such as olefins, acrylic or methacrylic compounds, styrene, vinyl xylene, methyl styrene, p-methoxystyrene and the like. They are, for example, acoyl peroxides such as benzoyl peroxide $C_6H_5CO$—O—O—$COC_6H_5$, lauroyl peroxide, cyclohexyl peroxide; ketone peroxides such as methylethylketone peroxide; organic hydroperoxides such as cyclohexyl hydroperoxide or cumene hydroperoxide, and easily decomposable organic nitrogen compounds such as thiatriazole, azodicarboxylic acid amide or azoisobutyric acid dinitrile. These radical-forming catalysts can be used in quantities of 0.1 to 10 wt. percent with reference to the sum of the two polymerization components, such as maleic acid anhydride and styrene, for example.

The copolymerization is performed at temperatures of at least 60° C. to the boiling point of the secondary aliphatic alcohol used. Within this temperature range, the rate of polymerization is so rapid that esterification of the maleic acid anhydride part is prevented. The use of temperatures below 60° C. is not recommended, because then the polymerization process is too slow, so that, with the longer reaction times necessitated by these circumstances, the polymerization would be inevitably accompanied to some extent by esterification.

Copolymerization is promoted by agitation, and it is mainly performed in about 10 to 30 minutes; however, to perfect the reaction, it is recommendable to allow the reaction mixture to continue to react, preferably with continued agitation, for another 1 to 2 hours.

The maleic acid anhydride copolymers manufactured according to the invention have a number of advantages. The included or adhering solvent residues are no longer troublesome in the transformation of the copolymers to water-soluble derivatives, since the low secondary alcohols used either mix with water without limitation (in the case of isopropanol) or are at least partially soluble in water (in the case of sec. butanol). A process for the removal of the solvent residues is thus avoided. Furthermore, the aliphatic secondary alcohols used in the process of the invention act as regulators with regard to the chain length of the copolymers obtained. For example, a copolymer made from 1 mol of maleic acid anhydride and 1 mol of styrene in boiling isopropanol (82° C.) has a much lower K value (according to Fikentscher) (K value 23) than a copolymer made from the same molar amounts of maleic acid anhydride and styrene with the same amount of the same catalyst at nearly the same temperature (80° C.) in boiling benzene (K value 69). Likewise, the copolymer made in boiling sec. butanol at 100° C. from 1 mol of maleic acid anhydride and 1 mol of styrene has a significantly lower K value (19) than a copolymer made in toluene under the same conditions at 100° C. (K value 29).

By K value it is meant the so-called inherent viscosity which is determined by the method of Hans Fikentscher from the viscosity-concentration curves of the high polymers, and which is published in the review "Cellulosechemie," volume 13, year 1932, pages 58–60. We refer also to the test specifications of the Germany Industry Standards "Normblatt DIN 53,726," and to "Methoden der Organischen Chemie," by Houben-Weyl, published by Georg Thieme Verlag, Stuttgart, 1961, vol. 14, 1st half, page 83.

Approximately the following relationship exists between Fikentscher's K value and the "intrinsic viscosity" ($\eta$) frequently used in American literature, in whose determination the concentration $c$ of the solution of the high-molecular substance is measured comparatively in grams per 100 cubic centimeters:

$$(\eta) = 2.3 \ (75 \cdot 10^{-6} \cdot K^2 + 10^{-3} \cdot K)$$

(Cf. "Handbuch der BASF Kunststoffe," 6th Ed., 1963, Badische Anilin- & Sodafabrik A. G., Ludwigshafen am Rhein, section 13, "Viskositatsmasse," pp. 231–233).

Accordingly, the above-stated K values correspond to the following "intrinsic viscosities":

| K value: | Intrinsic viscosity |
| --- | --- |
| 19 | 0.106 |
| 23 | 0.144 |
| 29 | 0.212 |
| 69 | 0.980 |

The invention will now be further explained by means of the following examples:

EXAMPLE 1

98 parts of maleic acid anhydride, 104 parts of styrene and 3 parts of benzoyl peroxide paste (50%) are dissolved together at 40° C. and then added within 10 minutes with agitation, to 800 parts of boiling isopropanol. The styrene-maleic acid anhydride copolymer precipitates as a white powder. The reaction is allowed to continue for another hour, and then the reaction mixture is cooled, filtered and washed once with isopropanol. After drying, a polymer product is obtained with an acid number of 540 and a K value of 23.

If benzene is used instead of isopropanol and the same procedure is used, a product is obtained with an acid number of 510 and a K value of 69.

EXAMPLE 2

98 parts of maleic acid anhydride, 104 parts of styrene and 10 parts of benzoyl peroxide paste (50%) are allowed to flow, as in Example 1, into 800 parts of boiling sec. butanol. After proceeding as above, a copolymer is obtained with an acid number of 490 and a K value of 19.

In the otherwise identical procedure, in which the reaction is performed in toluene at 100° C., a product is obtained which has an acid number of 500 and a K value of 29.

EXAMPLE 3

98 parts of maleic acid anhydride are dissolved in 80 parts of isopropanol. This solution is mixed with 104 parts of styrene and 10 parts of benzoyl peroxide paste (50%), and it is then added in the course of 20 minutes to 800 parts of boiling isopropanol. The white powder that precipitates is purified as in Example 1. It has an acid number of 525 and a K value of 23.

The portions stated in the examples are parts by weight.

EXAMPLE 4

98 parts maleic acid anhydride, 116 parts indene and 5 parts benzoyl peroxide paste are dissolved together at 40° C. and allowed to flow over a period of 10 minutes under stirring into boiling secondary-butanol. Maleic acid anhydride-styrene copolymer as white powder is formed. The reaction mixture is maintained at boiling temperature for one hour, and is then cooled, filtered, and washed once with secondary-butanol. After the drying, a polymer with an acid number fo 500 and a K value of 14.5 is obtained.

If toluene is used instead of secondary-butanol, and if otherwise one proceeds in the same manner, a copolymer with an acid number of 500 and a K value of 21 is obtained.

What is claimed is:
1. In the process for making copolymers containing anhydride groups from reactants maleic acid anhydride and other polymerizable unsaturated organic compound wherein said reactants are contacted in a reaction medium in which the reactants are soluble and are dissolved in the medium for the polymerization, and the copolymer is insoluble in the medium and precipitates therein, the improvement which comprises using as said reaction medium lower aliphatic secondary alcohol.

2. Process according to claim 1, wherein said reaction medium is an aliphatic secondary alcohol having 3–4 carbon atoms.

3. Process according to claim 1, wherein said unsaturated organic compound reactant is an olefinic hydrocarbon.

4. Process according to claim 3, wherein said olefinic hydrocarbon is selected from the group consisting of ethylene, propylene, butylene, isobutylene, diisobutylene, and tetrapropylene.

5. Process according to claim 1, wherein said unsaturated organic compound reactant is an olefincially unsaturated aromatic hydrocarbon.

6. Process according to claim 5, wherein said aromatic hydrocarbon is selected from the group consisting of styrene, methyl styrene, vinyl xylene, p-methoxystyrene, and divinyl benzene.

7. Process according to claim 1, wherein the polymerization is carried out at a temperature of 60° C. up to the boiling point of the reaction medium.

8. Process according to claim 1, wherein about equimolecular amounts of said reactants are used.

9. Process according to claim 1, wherein said contacting is in the presence of a catalyst that forms radicals.

10. Process according to claim 9, wherein said catalyst is acoyl peroxide.

11. Process according to claim 10, wherein said catalyst is selected from the group consisting of benzoyl peroxide, lauroyl peroxide, and cyclohexyl peroxide.

12. Process according to claim 9, wherein said catalyst is a ketone peroxide.

13. Process according to claim 12, wherein said catalyst is methyl ethyl ketone peroxide.

14. Process according to claim 9, wherein said catalyst is an organic hydroperoxide.

15. Process according to claim 14, wherein said catalyst is selected from the group consisting of cyclohexyl hydroperoxide and cumene hydroperoxide.

16. Process according to claim 9, wherein said catalyst is a decomposable organic nitrogen compound.

17. Process according to claim 16, wherein said catalyst is selected from the group consisting of thiatriazole, azodicarboxylic acid amide, and azoisobutyric acid dinitrile.

18. Process according to claim 9, wherein said catalyst is used in amount of about 0.1–10 wt. percent of the reactants.

19. Process according to claim 1, wherein the reaction medium consists of lower aliphatic secondary alcohol.

20. Process according to claim 1, wherein the reaction medium is substantially free of water.

References Cited

UNITED STATES PATENTS 3,166,534  1/1965  Perrins _____ 260—80.5

JOSEPH L. SCHOFER, *Primary Examiner.*

J. KIGHT, *Assistant Examiner.*